LADY'S FULL-FASHIONED HOSE HAVING A NON-BULKY SEAM

Original Filed June 25, 1957 2 Sheets-Sheet 1

INVENTORS
JAMES CHADBOURN BOLLES,
ROBERT M. MATTHEWS &
BY FRANK E. BOBO, JR.

Parrott & Richards
ATTORNEYS

LADY'S FULL-FASHIONED HOSE HAVING A NON-BULKY SEAM

Original Filed June 25, 1957 2 Sheets-Sheet 2

INVENTORS
JAMES CHADBOURN BOLLES,
ROBERT M. MATTHEWS &
FRANK E. BOBO, JR.
BY Parrott & Richards ATTORNEYS United States Patent Office Re. 24,737
Reissued Nov. 17, 1959

24,737

LADY'S FULL-FASHIONED HOSE HAVING A NON-BULKY SEAM

James Chadbourn Bolles and Robert M. Matthews, Charlotte, N.C., and Frank E. Bobo, Jr., Gainesville, Ga., assignors to Chadbourn Gotham, Inc., a corporation of North Carolina

Original No. 2,806,367, dated September 17, 1957, Serial No. 667,738, June 25, 1957. Application for reissue May 4, 1959, Serial No. 810,978

23 Claims. (Cl. 66—178)

Matter enclosed in heavy brackets [ ] appears in the original patent but forms no part of this reissue specification; matter printed in italics indicates the additions made by reissue.

This invention relates to a new ladies' full-fashioned hose having a flat seam of minimum bulk and minimum visibility, and to a process for producing such hose.

More particularly, this invention relates to a ladies' full-fashioned nylon hose wherein the seam is minimized by knitting in and beyond the nylon selvedge on each side of the stocking a panel of a different type of thread which is removable by chemical or other means. The stocking is then seamed in the usual manner, following which the threads forming the aforesaid panels are removed. When the stocking is worn, the resulting seam will flatten against the leg of the wearer and become almost invisible.

In the usual method of producing a full-fashioned stocking, the stocking fabric is knitted on a flat bed knitting frame. In the subsequent seaming operation, the two side selvedges are inserted into the fabric uncurler or guide on the seaming machine and the selvedges are sewed together to form a seam for the entire length of the stocking. The sheerness of the fabric, and the method of knitting, cause the fabric to curl or roll at the selvedge edges. Moreover, because of the sheerness of the fabric and the method of knitting the uncurlers on the seaming machine fail to uncurl the last two wales adjacent the selvedges.

In the seaming operation, the standard practice is for the operator to attempt to control the "bite" on the selvedge so that no more than 6 wales on each side are incorporated in the seam, including the two curled wales referred to above. Therefore, and depending upon the skill of the operator, in taking up the minimum number of wales in the seam, the usual seam in a ladies' full-fashioned hose has from about 12 to about 16 wales sewed into it.

The usual seam is therefore heavy, bulky, and markedly visible, even when using a self-colored seam. In view of the fact that a necessarily large number of wales of body yarns are incorporated in and bound together tightly by the seaming yarn, the resulting seam has a large and rope-like or cord-like appearance and feel. Moreover, this cord-like seam retains its shape when the stocking is stretched, and stands out in a pronounced manner from the rest of the stocking, resulting in considerable discomfort to the wearer. In fact, the usual seam is so objectionable that a large percentage of wearers of full-fashioned hosiery wear the hosiery reversed, or wrong side out, to relieve to some extent the discomfort caused by the pressure of the bulky, cord-like seam.

We have now found it possible to produce a full-fashioned hose with a non-bulky seam which flattens against the leg and foot of the wearer and becomes substantially invisible when the hose is worn. The seam in our new hose contains usually not more than about 4 to 8 wales.

It will therefore be apparent that we have provided, for the first time, a full-fashioned hose having a seam which flattens against the wearer and becomes substantially invisible, and the first known method whereby such a hose can be produced. This new hose combines the most important qualities of full-fashioned hose, particularly, better fit, with the principal advantage of seamless hose, namely, the absence of an apparent seam.

The seam in our new hose is detectable only on reasonably close scrutiny, but is not visible under normal circumstances, e.g. to an observer standing only a few feet away from the wearer.

The new hose of our invention and the preferred process for producing the same will be described and illustrated below, with reference to the accompanying drawing, in which.

Figure 1:
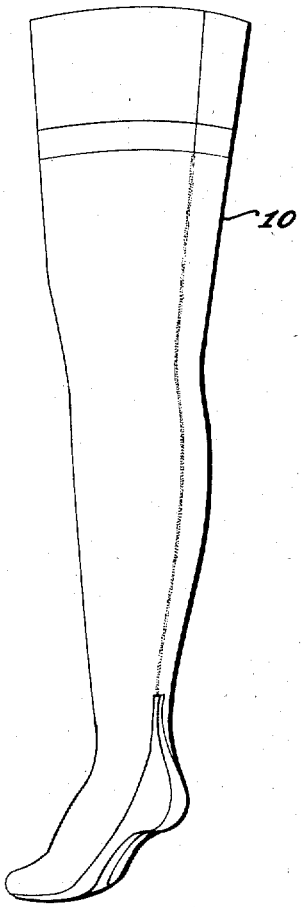
Fig. 1 is a rear elevational view of the new hose of our invention.
Figure 2:
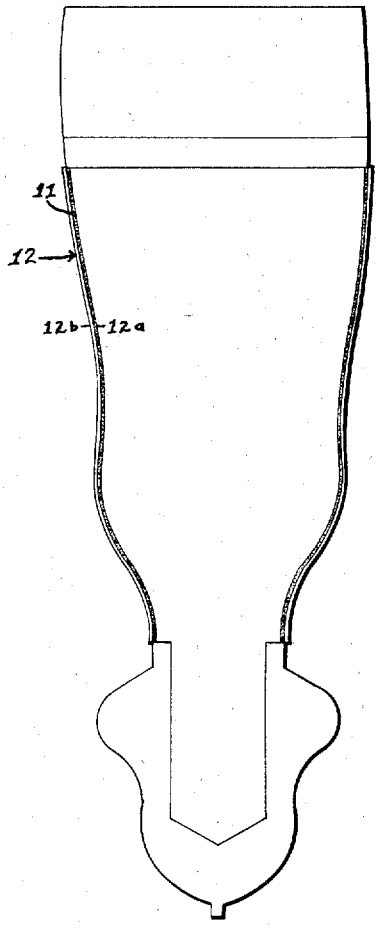
Fig. 2 is a diagrammatic view of the completed stocking blank prior to seaming.
Figure 3:
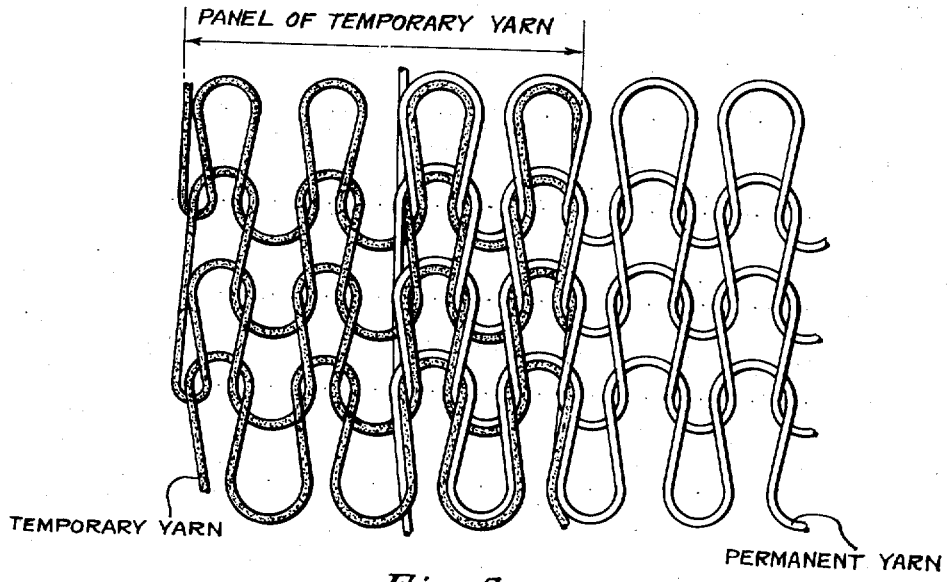
Figure 4:
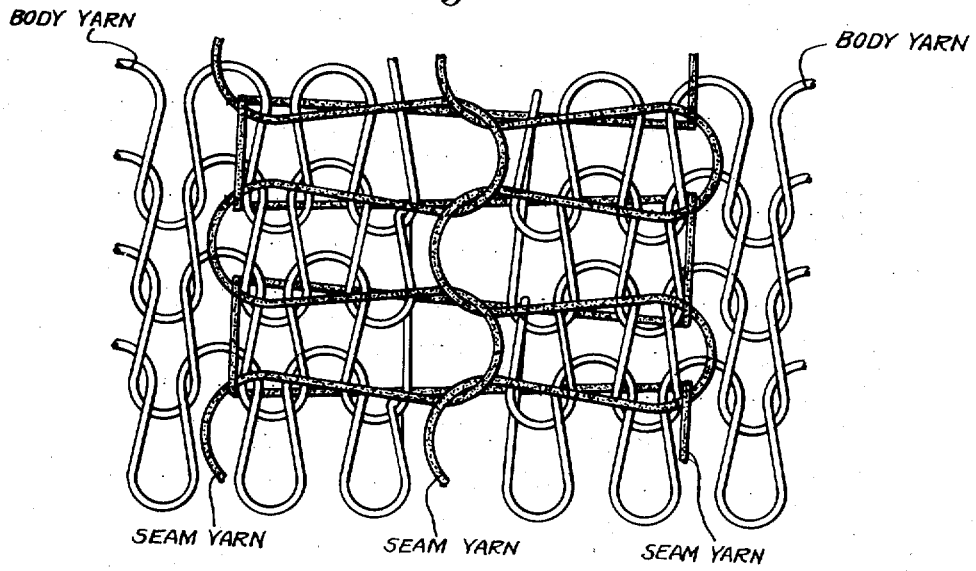

Fig. 3 is an enlarged fragmentary view of a portion of the selvedge of the blank shown in Fig. 2, incorporating a panel knitted from a temporary yarn; and Fig. 4 is an enlarged fragmentary view of a portion of the stocking shown in Fig. 1, showing the open nature of the stitches in the finished seam, such that one can see through the seam when the stocking is worn, thereby minimizing the apparent bulk of the seam.

To produce the hose 10 shown in Fig. 1, the stocking blank is knitted in the usual manner on a flat bed knitting frame. However, during the knitting process an additional yarn carrier is inserted for each selvedge. Through each of said additional yarn carriers a silk thread is delivered to the two needles forming the last two loops before reaching the nylon selvedge edge. The silk thread is also delivered to two or more additional needles beyond the nylon selvedge edge 11, forming a silk selvedge two or more wales beyond the nylon selvedge edge. In other words, a panel 12 is formed at each selvedge. This panel 12, is in two parts, part 12a consisting of two or more wales formed of a silk yarn and a nylon yarn knitted together in each course, and part 12b consisting of two or more wales formed only of silk thread.

In the stocking blank illustrated in Fig. 2, the finished hose will have our new seam extending only throughout the leg portion, but as will be pointed out below, it will in many cases be preferable to extend this new seam to other portions of the hose as well.

The stocking blank is then fed into the seaming machine fabric uncurler or guide in the usual manner, and a nylon thread approximately equivalent to that utilized in the leg portion is used to seam the two selvedge edges together. In the seaming operation, in which about 4 to 8 wales of each selvedge are incorporated in the seam, the presence of the two or more wales of silk comprising part 12b of panel 12 prevents the seaming machine from taking in more than two or three wales of the nylon. Therefore, the bulk of the fabric which has been gathered into the seam consists of silk thread, but otherwise the seam has the objectionable cord-like or rope-like appearance and feel of the usual seam.

The hose is then treated for a period of about 40 to 60 minutes in a bath at a temperature of about 212° F., containing about 20 pounds of caustic soda per 100 pounds of goods. This treatment completely dissolves the silk thread in the seam leaving a seam which incorporates a total of about 4 to 8 wales of nylon. Since a large proportion of the material incorporated in the seam has been removed, the remainder, consisting of a few wales adjacent the nylon selvedge, is loosely held together by the yarn forming the seam. Therefore, when the stocking is stretched to the extent that it would normally be stretched on the leg of the wearer, the seam is enabled to flatten in a plane substantially parallel to the surface of the body fabric.

Following the removal of the silk, the hose are inspected, dyed and finished in the usual manner.

The method of forming the stocking is set forth in the following illustrative, but non-limiting example:

A stocking blank is knitted in the normal manner on a flat bed knitting frame, except that, throughout the length of the whole stocking, an extra yarn carrier carrying a three-thread silk yarn, is inserted at each selvedge. These two yarn carriers overlap the nylon selvedge to the extent of two needles or wales, and move so as to knit two additional wales beyond the nylon selvedge. The yarn utilized in the leg portion of the stocking is a 15 denier nylon yarn.

The stocking blank is then fed into the seaming machine fabric uncurler or guide in the usual manner, and seamed, using a three-thread chain lock stitch. The yarn utilized to form the seam is a 15 denier nylon yarn, and is of the same denier as the yarn utilized in the leg portion.

After seaming, the stocking is treated in a caustic soda bath as above described, at a temperature of about 212° F. for a period of about 40 to 60 minutes, or until the silk is dissolved.

The stocking is inspected, dyed and seamed in the usual manner.

The finished stocking is found to have a very small non-bulky seam containing only about four wales of nylon, two from each selvedge edge. This seam will flatten against the leg of the wearer, and become substantially invisible. At the same time, the strength of the seam is not materially affected, since the strength of a seam does not depend upon its bulk.

Although the invention has been described above in detail for the purpose of illustration, it will be understood that this invention is not limited to particular yarns, yarn sizes, or yarn removal treatments. The yarn from which the leg portion is formed need not necessarily be a nylon yarn, but may be any yarn suitable for forming a full-fashioned hose, for example, a low denier "Dacron" yarn. It will be understood, however, that the greatest present application will be to nylon hosiery.

Moreover, it will be understood that this invention is not limited to the use of our new seam throughout the length of the stocking, but includes a stocking in which our new seam is utilized in any part thereof. For example, this new seam can be utilized only in the leg portion, where reduced visibility is of maximum importance, or only in the foot portion, where some wearers experience maximum discomfort from a cord-like seam.

Similarly, the invention is particularly useful in connection with high fashion very sheer hosiery, the leg portion of which is formed from 15, 12, 10, or 7 denier nylon, or the equivalent, either monofilament or multifilament. However, it will also be apparent that the invention can be applied to service weight hose, for example, to reduce the size and bulkiness that are present in the usual cord-like seam.

The removable yarn need not be a silk yarn. In fact, the selvedge panels may be formed of another type of yarn which is removable, preferably by chemical means, i.e. rayon, acetate, or soluble cotton.

The weight of the silk or other removable thread utilized may vary, depending upon the size of the leg yarn and the gauge of the knitting machine. When 15 denier nylon yarn is utilized in the leg, it is preferable to use a three-thread silk; with lower nylon deniers, such as 12, 10, or 7, two-thread silk is preferred. Also, the silk or other removable thread may be a colored thread, if desired, thereby increasing the efficiency of the seaming operation, since the operator will be better able to observe the extent to which the silk panel extends inwardly of the nylon selvedge.

The yarn used for seaming is preferably roughly equivalent in size to the leg yarn, and is a yarn either of the same type, or a different type which is not damaged by the treatment which removes the panel yarns. The more exact the equivalence between the seaming yarn and the leg yarns, as to both type, size and color, the more invisible the seam.

In other words, it is desirable to use a seaming yarn of substantially the same appearance as the body yarn. It is apparent that when we refer to a seaming yarn having the same [appeaarance] *appearance* as said body yarn, we mean to include any seaming yarn which in the finished stocking, will not stand out visibly in marked contrast to the body portion to such an extent that when the stocking is worn the seam is substantially visible.

Throughout the specification and claims hereof, with reference to the number of wales incorporated in the seam, it will be understood that this number may vary somewhat from the usual or normal number. This variation is to be expected even in the case of the most skilled operators. In any given stocking it will be found that while the average number of wales taken into the seam, at given points along the seam is 14, for example, in the usual stocking, there may be a few points at which 16 wales are incorporated, and a few points at which 12 wales are incorporated. Similarly, in the hose of the present invention, there will be some variation in the number of wales incorporated in the seam, but generally, and throughout the major portion of the length of the seam, not more than 8 wales will be found incorporated in the seam.

Moreover, where we refer to a relatively few wales being incorporated in the seam, it is apparent that we mean a number of wales which is less, or relatively fewer, than the number incorporated in the usual seam of a full-fashioned stocking of comparable sheerness.

It will also be apparent that the seam will not always incorporate a given number of wales from each selvedge. For example, where the number of wales incorporated in the seam is 8, four may come from one selvedge and four from the other, three from one and five from the other, and so on. It is desirable, however, to incorporate at least two wales from each selvedge.

From the foregoing description, it will be seen that this invention provides a full-fashioned hose having a non-bulky, almost invisible seam, and a process for producing the same [, and this invention is not intended to be limited by the foregoing description or otherwise, except as defined in the appended claims]. *The flat or non-bulky type seam of this invention has been described hereinabove with particular reference to full-fashioned hosiery but it is to be understood that this type of seam is of advantage, from the comfort and appearance standpoints in other knitted garments and in knitted fabrics generally. Also, it is to be understood that the flat seam of this invention may be used in hosiery or other garments knitted with stretch yarns or non-stretch yarns. The scope of the invention is to be limited only by the appended claims.*

We claim:

1. A lady's full-fashioned sheer hose having an unknitted seam extending at least throughout a portion of said hose in which said seam is formed from a yarn of substantially the same appearance as the yarn used to form said portion and in which a relatively few wales are incorporated in said seam and are loosely held therein and in which said seam flattens when said hose is worn so as to minimize the apparent bulk of the seam and render it practically invisible.

2. A lady's full-fashioned hose comprising a leg portion knitted from a nylon yarn of relatively fine denier, and an unknitted seam extending at least throughout said leg portion formed from a yarn of substantially the same appearance as said nylon yarn from which said leg portion was knitted, said seam loosely incorporating not more than eight wales of said leg portion throughout the major portion of the length of said seam, whereby said seam flattens and becomes substantially invisible when said hose is worn.

3. A lady's full-fashioned hose comprising at least a portion knitted from a yarn of relatively fine denier and an unknitted seam formed from a yarn of substantially the same appearance as the yarn from which said portion is knitted and extending throughout said hose and in which the relatively few wales incorporated in said seam are loosely held therein and in which said seam flattens when said hose is worn so as to minimize the apparent bulk of the seam and render it substantially invisible.

4. A stocking blank for a lady's full-fashioned hose comprising a body portion knitted from permanent yarn and a panel portion at each selvedge of said body portion and extending at least throughout a portion of said stocking blank, said panel portion overlapping said selvedge and extending therebeyond, said panel portion being knitted from a removable yarn, whereby said stocking blank may be seamed and said panel thereafter removed to form a non-bulky seam which flattens when said hose is worn so as to minimize the apparent bulk of the seam.

5. A lady's full-fashioned hose comprising a body portion formed from permanent yarn and a seam extending at least throughout a portion of said hose, said seam incorporating wales formed from said permanent yarn and wales formed from a temporary removable yarn, whereby said temporary yarn may be removed to form a non-bulky seam which flattens when said hose is worn so as to minimize the apparent bulk of the seam.

6. A lady's full-fashioned hose, comprising a body portion knitted from a permanent yarn and a seam extending at least throughout the leg portion, comprising a permanent yarn equivalent in type, size and color to said body yarn, said seam incorporating wales formed from said permanent yarn and wales formed from a temporary removable yarn, whereby said temporary yarn may be removed to form a non-bulky seam which flattens when said hose is worn so as to minimize the apparent bulk of said seam.

7. A method of producing a lady's full-fashioned nylon hose having a non-bulky seam which flattens against the wearer when said hose is worn, said seam extending at least throughout a portion of said hose, comprising knitting a panel from a removable thread at each selvedge of said portion, seaming said hose, and removing said removable thread.

8. A method of producing a lady's full-fashioned nylon hose having a non-bulky seam which flattens against the wearer when said hose is worn, comprising knitting the body portion from permanent yarn, knitting at least throughout a portion of the length of said body portion a panel at each selvedge of said portion from a temporary, removable yarn, said panel overlapping said selvedge and extending at least two wales beyond said selvedge, seaming the hose in a manner to incorporate at least one wale of said selvedge in said seam, and removing said panel.

9. A method as defined in claim 8, in which said temporary yarn is removed by decomposition in a chemical agent.

10. A method as defined in claim 8, in which said temporary yarn is a silk yarn.

11. A method as defined in claim 10, in which said silk yarn is removed by treating said hose in a caustic soda bath.

12. A method of [producng] *producing* a lady's [full-fashoned] *full-fashioned* nylon hose having a non-bulky seam which flattens against the wearer when said hose is worn, said seam extending at least throughout a portion of said stocking, comprising knitting the leg portion from nylon yarn, knitting a panel from silk yarns at each selvedge of said nylon, said silk being knit in at least one wale at said selvedge and extending therebeyond at least one wale, seaming said hose and treating said hose in a caustic soda bath for a period of time sufficient to dissolve said silk yarn.

13. A method of producing a lady's full-fashioned nylon hose having a non-bulky seam which flattens when said hose is worn, comprising knitting the leg portion from nylon yarn, knitting a panel of temporary yarn at each nylon [selevedge] *selvedge,* said panel overlapping said nylon selvedge and extending therebeyond, seaming said hose in a manner to incorporate in said seam the bulk of said temporary yarns and at least one wale of nylon from each selvedge, and removing said temporary yarn.

14. A full-fashioned sheer stocking having a unknitted, minimized bulk, flat seam, comprised of a seaming yarn of substantially the same appearance as the body yarn and incorporating loosely a relatively few wales, whereby the seam flattens and is rendered substantially transparent and [scarecely] *scarcely* discernible, when the stocking is worn.

15. A full-fashioned sheer stocking having an unknitted seam comprising a yarn of substantially the same color as the body yarn, loosely incorporating a relatively few wales, whereby said seam flattens and becomes substantially invisible when said stocking is worn.

16. A full-fashioned sheer hose having an unknitted seam extending throughout at least a portion thereof, said seam comprising a yarn which will not contrast with the body yarn and which loosely incorporates a relatively few wales whereby said seam flattens and becomes substantially invisible when said hose is worn.

17. A full-fashioned sheer stocking having an unknitted seam comprising a yarn of substantially the same color and denier as the body yarn, loosely incorporating a relatively few wales, whereby said seam flattens and becomes substantially invisible when said stocking is worn.

18. A lady's full-fashioned nylon hose as defined in claim 2 and in which said yarn forming said seam is a nylon yarn.

19. A lady's full-fashioned hose as defined in claim 3, and in which said yarn of relatively fine denier is a nylon yarn.

20. A full-fashioned hose, comprising a leg portion knitted from a yarn of not more than 15 denier and a seam extending at least throughout said portion, said seam being formed from a yarn which will not contrast visibly with said yarn from which said leg portion is knitted and loosely incorporating a relatively few wales, whereby said seam flattens and becomes substantially invisible when said hose is worn.

21. A full-fashioned hose as defined in claim 20, in which said yarn from which said seam is formed is a yarn of substantially the same denier as said yarn from which said leg portion is knitted.

*22. A knitted fabric having an unknitted seam extending at least throughout a portion of said fabric in which said seam is formed from a yarn of substantially the same appearance as the yarn used to form said portion and in which a relatively few wales are incorporated in said seam and are loosely held therein and in which said seam flattens when said fabric is stretched so as to minimize the apparent bulk of the seam and render it practically invisible.*

*23. A method of producing a knitted fabric having a non-bulky seam which flattens when said fabric is*

*stretched, said seam extending at least throughout a portion of said fabric, comprising knitting a panel from a removable thread at each selvedge of said portion, seaming said fabric, and removing said removable thread.*

References Cited in the file of this patent or the original patent

UNITED STATES PATENTS

| | | |
|---|---|---|
| 68,087 | Kilbourne | Aug. 27, 1867 |
| 456,468 | Borton | July 21, 1891 |
| 1,778,221 | Mack | Oct. 14, 1930 |
| 1,984,970 | Goodman | Dec. 18, 1934 |
| 2,181,836 | Smetana | Nov. 28, 1939 |
| 2,296,303 | Weisbecker | Sept. 22, 1942 |
| 2,301,703 | Humphreys | Nov. 10, 1942 |
| 2,512,489 | Dills | June 20, 1950 |
| 2,575,008 | Dorgin | Nov. 13, 1951 |
| 2,617,114 | Sanson | Nov. 11, 1952 |
| 2,731,788 | Donaldson | Jan. 24, 1956 |

FOREIGN PATENTS

| | | |
|---|---|---|
| 347,800 | Great Britain | May 7, 1931 |
| 566,507 | Great Britain | Jan. 2, 1945 |